(12) United States Patent
Yeo et al.

(10) Patent No.: US 12,469,195 B2
(45) Date of Patent: Nov. 11, 2025

(54) ELECTRONIC DEVICE SUPPORTING MANUFACTURE OF SEMICONDUCTOR DEVICE AND OPERATING METHOD OF ELECTRONIC DEVICE

(71) Applicant: Samsung Electronics Co., Ltd., Suwon-si (KR)

(72) Inventors: Sang Chul Yeo, Suwon-si (KR); Yongjin Chun, Suwon-si (KR); Min-Cheol Kang, Suwon-si (KR); Jaewon Yang, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 167 days.

(21) Appl. No.: 18/528,275

(22) Filed: Dec. 4, 2023

(65) Prior Publication Data
US 2024/0386635 A1 Nov. 21, 2024

(30) Foreign Application Priority Data
May 16, 2023 (KR) .................. 10-2023-0063174

(51) Int. Cl.
| | |
|---|---|
| *G06T 11/60* | (2006.01) |
| *G06T 7/13* | (2017.01) |
| *G06V 10/24* | (2022.01) |
| *G06V 10/50* | (2022.01) |
| *G06V 10/74* | (2022.01) |

(52) U.S. Cl.
CPC .............. *G06T 11/60* (2013.01); *G06T 7/13* (2017.01); *G06V 10/24* (2022.01); *G06V 10/50* (2022.01); *G06V 10/761* (2022.01); *G06T 2207/20081* (2013.01); *G06T 2207/20192* (2013.01)

(58) Field of Classification Search
CPC ......... G06T 11/60; G06T 7/13; G06V 10/761; G06V 10/24; G06V 10/50
USPC .......................................................... 345/619
See application file for complete search history.

(56) References Cited

U.S. PATENT DOCUMENTS

| | | | |
|---|---|---|---|
| 7,668,373 B2 | 2/2010 | Mitsui | |
| 7,978,904 B2 * | 7/2011 | Toyoda ................... | G06T 7/001 |
| | | | 382/199 |
| 8,148,682 B2 | 4/2012 | Hotta et al. | |
| 8,942,464 B2 | 1/2015 | Shibahara et al. | |

(Continued)

FOREIGN PATENT DOCUMENTS

JP 2014126445 A 7/2014

*Primary Examiner* — Thomas J Lett
(74) *Attorney, Agent, or Firm* — Harness, Dickey & Pierce, P.L.C.

(57) ABSTRACT

Disclosed is an operating method of an electronic device which includes a processor and supports manufacture of a semiconductor device. The operating method includes receiving, at the processor, a layout image for the manufacture of the semiconductor device and a captured image generated by capturing the semiconductor device actually manufactured, aligning, at the processor, the layout image and the captured image based on a result of emphasizing edges and corners of the layout image and the captured image, and performing, at the processor, learning based on the aligned layout image and the aligned captured image such that a first modified layout image is generated from the layout image, and the semiconductor device is manufactured based on a second modified layout image generated from the layout image.

20 Claims, 15 Drawing Sheets

(56) References Cited

U.S. PATENT DOCUMENTS

| | | | |
|---|---|---|---|
| 9,529,960 B2 | 12/2016 | Choi et al. | |
| 9,875,534 B2 | 1/2018 | Sezginer et al. | |
| 10,871,708 B2 * | 12/2020 | Slonaker | G03F 7/2004 |
| 2005/0084778 A1 * | 4/2005 | Yu | G03F 9/7019 |
| | | | 430/30 |
| 2021/0294219 A1 | 9/2021 | Wang | |

* cited by examiner

ELECTRONIC DEVICE SUPPORTING MANUFACTURE OF SEMICONDUCTOR DEVICE AND OPERATING METHOD OF ELECTRONIC DEVICE

CROSS-REFERENCE TO RELATED APPLICATIONS

This application claims priority under 35 U.S.C. § 119 to Korean Patent Application No. 10-2023-0063174 filed on May 16, 2023, in the Korean Intellectual Property Office, the disclosures of which are incorporated by reference herein in their entireties.

BACKGROUND

Embodiments of the present disclosure described herein relate to an electronic device, and more particularly, relate to an electronic device supporting the manufacture of a semiconductor device through more accurate learning and an operating method of the electronic device.

Semiconductor devices are manufactured through various processes. With the development of semiconductor design technologies, the number of processes for manufacturing a semiconductor device is increasing, and the complexity of each process is increasing. As the number of semiconductor processes and the complexity increase, various defects may occur in the process of manufacturing a semiconductor device.

To prevent various defects from occurring, there may be used a method of modifying a layout designed for the manufacture of a semiconductor device and manufacturing a semiconductor device by using the modified layout. The process of generating the modified layout may be experientially performed based on features of materials and processes that are used to manufacture a semiconductor device.

To automatize the experiential layout modification, the machine learning may be applied to modify the layout. The machine learning requires a great amount of source information for learning. Also, there is a need to align a great amount of source information for the purpose of performing the learning for generating the modified layout more accurately.

SUMMARY

Embodiments of the present disclosure provide an electronic device capable of reducing a time and costs for the manufacture of a semiconductor device by accurately and quickly aligning source information of machine learning for supporting the manufacture of a semiconductor device and an operating method of the electronic device.

According to an embodiment, an operating method of an electronic device which includes a processor and is configured to support manufacture of a semiconductor device includes receiving, at the processor, a layout image for the manufacture of the semiconductor device and a captured image generated by capturing the semiconductor device actually manufactured; emphasizing, at the processor, edges and corners of the layout image and of the captured image in response to a determination that there are two or more different orientations in the layout image; aligning, at the processor, the layout image and the captured image based on a result of the emphasizing of the edges and the corners of the layout image and of the captured image; and performing, at the processor, learning based on the aligned layout image and the aligned captured image such that a first modified layout image is generated from the layout image, and the semiconductor device is manufactured based on a second modified layout image generated from the layout image based on the learning.

According to an embodiment, an operating method of an electronic device which includes a processor and is configured to support manufacture of a semiconductor device includes receiving, at the processor, a layout image for the manufacture of the semiconductor device; and generating, at the processor, a modified layout image by modifying the layout image by using a machine learning-based modification module. The machine learning-based modification module is trained to generate the modified layout image from the layout image based on a plurality of layout images and a plurality of captured images of a plurality of semiconductor devices actually manufactured based on a plurality of modified layout images generated from the plurality of layout images. The machine learning-based modification module is trained to emphasize and align edges and corners of the plurality of layout images and the plurality of captured images and to generate the modified layout image from the layout image based on the aligned layout images and the aligned captured images.

According to an embodiment, an electronic device for manufacture of a semiconductor device includes a processor, and a memory including a plurality of layout images for manufacture of a plurality of semiconductor devices and a plurality of captured images captured after the plurality of semiconductor devices are manufactured. The processor performs learning by emphasizing edges and corners of the plurality of layout images and the plurality of captured images to align the plurality of layout images and the plurality of captured image such that the processor is trained to generate a modified layout image from a layout image based on the aligned layout images and the aligned captured images.

BRIEF DESCRIPTION OF THE FIGURES

The above and other objects and features of the present disclosure will become apparent by describing in detail embodiments thereof with reference to the accompanying drawings.

DETAILED DESCRIPTION

Below, embodiments of the present disclosure will be described in detail and clearly to such an extent that an ordinary one in the art easily carries out the present disclosure.

Figure 1:
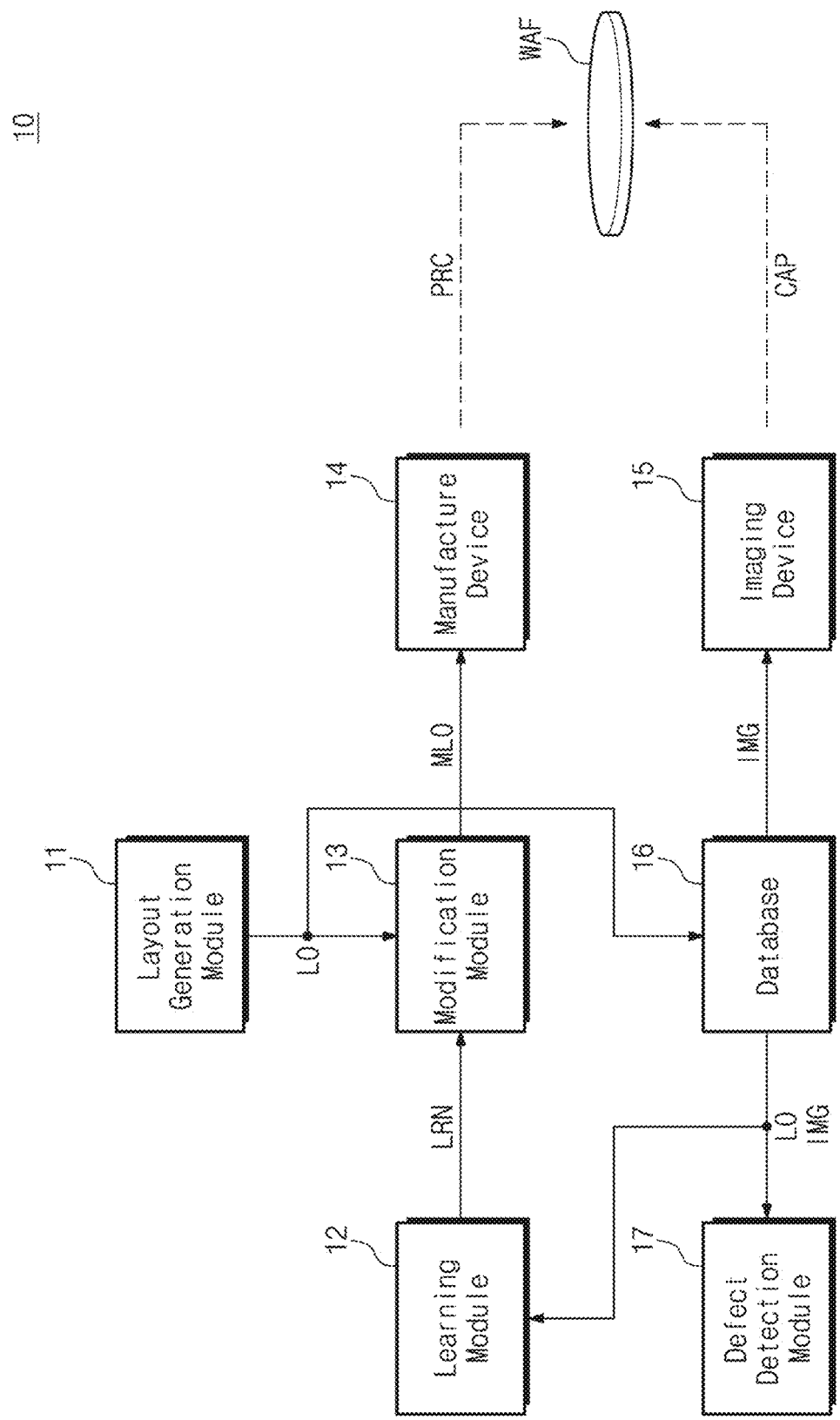
FIG. 1 illustrates a semiconductor manufacturing system according to at least one embodiment of the present disclosure.

FIG. 1 illustrates a semiconductor manufacturing system 10 according to at least one embodiment of the present disclosure. Referring to FIG. 1, the semiconductor manufacturing system 10 may include a layout generation module 11, a learning module 12, a modification module 13, a manufacture device 14, an imaging device 15, a database 16, and a defect detection module 17. The semiconductor manufacturing system 10 may manufacture semiconductor devices by using a wafer WAF.

The layout generation module 11 is configured to generate a layout image LO. For example, the layout generation module 11 may generate and/or receive circuit-based design information. The layout generation module 11 may generate the layout image LO by placing standard cells in the layout image LO based on the design information. Alternatively, after placing the standard cells, the layout generation module 11 may generate the layout image LO by modifying the standard cells and/or by placing specialization cells, which are not included in the standard cells, under control of the user. Thereby, for example, the layout image LO that the layout generation module 11 generates may be a new layout image LO for the manufacture of new semiconductor devices.

The learning module 12 is configured to perform learning LRN of the modification module 13. For example, the learning module 12 may generate and update the modification module 13 based on machine learning. In at least one embodiment, the learning module 12 may include a structure that is trainable, such as an artificial neural network, a decision tree, a support vector machine, a Bayesian network, a genetic algorithm, a convolution neural network (CNN), a generative adversarial network (GAN), a recurrent neural network (RNN), a stacking-based deep neural network (S-DNN), a restricted Boltzmann machine (RBM), a fully convolutional network, a long short-term memory (LSTM) network, a classification network, and/or the like. For example, the learning module 12 may perform the learning LRN based on various machine learning algorithms such as a neural network and/or a generative adversarial network (GAN).

The learning module 12 is configured to receive, as training inputs, the layout image LO (or a modified layout image MLO) and a captured image IMG from the database 16. The layout image LO may be an image of an initial layout for the manufacture of a semiconductor device; and the captured image IMG may be an image generated by capturing a semiconductor device manufactured based on the layout image LO (or the modified layout image MLO). For example, the learning module 12 may perform the learning LRN of the modification module 13 based on a pre-image of a manufactured semiconductor device (e.g., the layout image LO for the manufacture of a semiconductor device or the modified layout image MLO) and a post-image (e.g., the captured image IMG after the manufacture of a semiconductor device). The learning module 12 may, therefore, be trained to output learning LRN based on, e.g., differences between the layout image LO and the capture image IMG.

The modification module 13 may be trained by the learning module 12. The modification module 13 may receive the layout image LO for the manufacture of new semiconductor devices from the layout generation module 11. In at least one embodiment, the modification module 13 may be trained to generate the modified layout image MLO from the layout image LO. In at least one embodiment, the training of the modification module 13 is based on the learning LRN by the learning module 12.

For example, the modification module 13 may be trained to generate the modified layout image MLO from the layout image LO based on various factors to be caused in the process of manufacturing semiconductor devices. For example, in at least one embodiment, the modification module 13 may be trained to generate the modified layout image MLO based at least on a process proximity correction (PPC) and/or an optical proximity correction (OPC).

For example, the optical proximity correction may be performed to correct distortions caused in photoresist patterns due to various factors, which include a feature of a light source, a feature of a photoresist, positional relationships between the light source and patterns formed in the photoresist, etc., in the process of generating a photomask for manufacturing a semiconductor device. The process proximity correction may be used to correct distortions caused during processes (e.g., an etching process) due to various factors including a feature of materials for performing a process, a feature of materials to which the process is applied, a feature of photoresist patterns, etc.

The manufacture device 14 may receive the modified layout image MLO from the modification module 13. The manufacture device 14 may apply and/or modify processes PRC to the wafer WAF based on the modified layout image MLO. For example, the processes PRC may include an etching process, a deposition process, a growth process, a planarization process, etc. For example, processes PRC may be added, modified, and/or omitted based on the modified layout image MLO. In at least one embodiment, for example, the angle of the light source and/or pattern may be adjusted, the duration of a process may be modified (e.g., decreased and/or increased), critical dimensions (CD) may be modified, the shape of features in a photomask may be adjusted, etc. As the processes PRC are applied to the wafer WAF, semiconductor devices may be formed in the wafer WAF.

The imaging device 15 is configured to generate the captured image IMG by capturing an image of the semiconductor devices formed in the wafer WAF (refer to "CAP" of FIG. 1). In at least one example embodiment, the imaging device 15 may include an electron microscope, such as a scanning electron microscope (SEM).

The database 16 is configured to receive the layout image LO from the layout generation module 11 and to receive the captured image IMG of the semiconductor devices manufactured based on the layout image LO from the imaging device 15. The database 16 is configured to store and manage a pair of the layout image LO and the corresponding captured image IMG.

The defect detection module 17 is configured to receive the layout image LO and the corresponding captured image IMG from the database 16 and to detect defects of the semiconductor devices by comparing the layout image LO and the captured image IMG. For example, the defect detection module 17 may detect defects of the semiconductor devices by comparing a pre-image (e.g., the layout image LO) and a post-image (e.g., the captured image IMG) of the semiconductor devices. In at least one embodiment, the database 16 and/or the learning module 12 receives data representing the defects detected by the defect detection module 17, such that defects data may be included in the learning LRN.

The learning module 12 may further receive the layout image LO and the captured image IMG used for the manufacture of the semiconductor devices from the database 16 and may perform learning.

In at least one embodiment, the layout generation module 11, the learning module 12, the modification module 13, and the defect detection module 17 may be implemented with software executable by a processor, a processor designed to perform a relevant function, or a combination of hardware and software designed to a relevant function.

Figure 2:
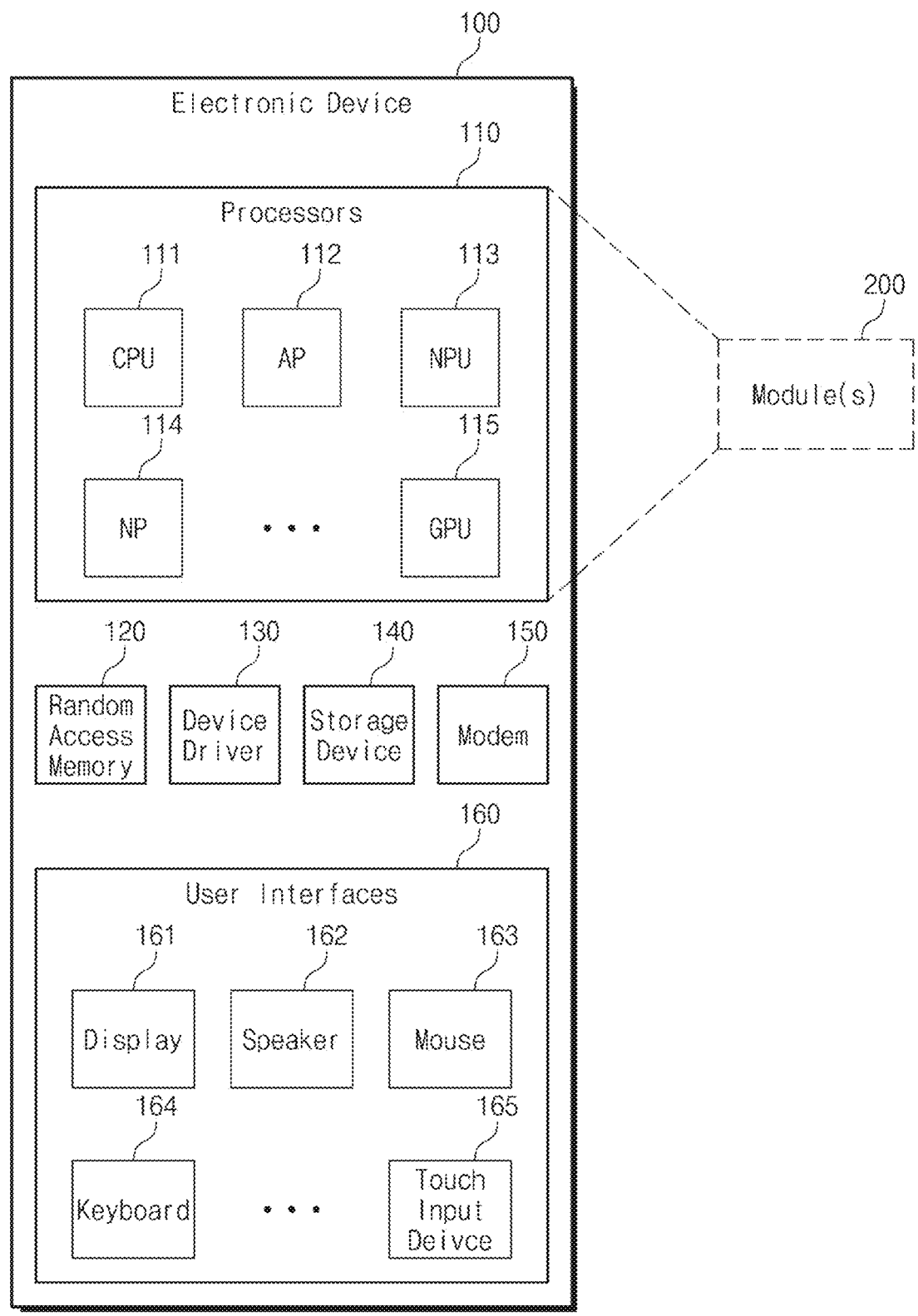
FIG. 2 is a block diagram illustrating an electronic device according to at least one embodiment of the present disclosure.

FIG. 2 is a block diagram illustrating an electronic device 100 according to at least one embodiment of the present disclosure. Referring to FIG. 2, the electronic device 100 may include processors 110, a random access memory 120, a device driver 130, a storage device 140, a modem 150, and user interfaces 160.

The processors 110 may include, for example, at least one general-purpose processor such as a central processing unit (CPU) 111 and/or an application processor (AP) 112. Also, the processors 110 may further include at least one special-purpose processor such as a neural processing unit (NPU) 113, a neuromorphic processor (NP) 114, and/or a graphics processing unit (GPU) 115. In at least one embodiment, processors 110 may include two or more homogeneous processors.

At least one of the processors 110 may be used to train a module(s) 200 or to execute the trained module(s) 200. At least one of the processors 110 may train or execute the module(s) 200 based on various data or information. For example, the module(s) 200 may be implemented in the form of instructions (or codes) that are executed by at least one of the processors 110. In this case, the at least one processor may load the instructions (or codes) of the module(s) 200 to the random access memory 120.

For another example, at least one (or at least another) processor among the processors 110 may be manufactured to implement the module(s) 200. For example, at least one processor may be a dedicated processor that is implemented in hardware based on the module(s) 200 generated by the learning of the module(s) 200.

For another example, at least one (or at least another) processor among the processors 110 may be manufactured to implement various machine learning or deep learning modules. The at least one processor may implement the module(s) 200 by receiving information (e.g., instructions or codes) corresponding to the module(s) 200.

The random access memory 120 may be used as a working memory of the processors 110 and/or may be used as a main memory or a system memory of the electronic device 100. The random access memory 120 may include, for example, a volatile memory (such as a dynamic random access memory or a static random access memory), and/or a nonvolatile memory (such as a phase-change random access memory, a ferroelectric random access memory, a magnetic random access memory, or a resistive random access memory).

The device driver 130 may control the following peripheral devices (e.g., the storage device 140, the modem 150, and the user interfaces 160) depending on a request of the processors 110. The storage device 140 may include a stationary storage device (such as a hard disk drive or a solid state drive), and/or a removable storage device (such as an external hard disk drive, an external solid state drive, or a removable memory card).

The modem 150 is configured to provide remote communication with the external device. The modem 150 may perform wired or wireless communication with the external device. The modem 150 may communicate with the external device based on at least one of various communication schemes such as Ethernet, wireless-fidelity (Wi-Fi), long term evolution (LTE), 5th generation (5G) mobile communication, and/or the like.

The user interfaces 160 may receive information from the user and/or may provide information to the user. The user interfaces 160 may include at least one user output interface (such as a display 161 or a speaker 162), and at least one user input interface (such as a mouse 163, a keyboard 164, or a touch input device 165).

The instructions (or codes) of the module(s) 200 may be received through the modem 150 and may be stored in the storage device 140. The instructions (or codes) of the module(s) 200 may be stored in a removable storage device, and the removable storage device may be connected to the electronic device 100. The instructions (or codes) of the module(s) 200 may be loaded and executed to the random access memory 120 from the storage device 140.

In at least one embodiment, the module(s) 200 may include at least one of the layout generation module 11, the learning module 12, the modification module 13, and the defect detection module 17 described with reference to FIG. 1. The layout generation module 11, the learning module 12, the modification module 13, and the defect detection module 17 may be implemented or executed in different electronic devices. At least two of the layout generation module 11, the learning module 12, the modification module 13, and the defect detection module 17 may be implemented or executed in one electronic device.

Figure 3:
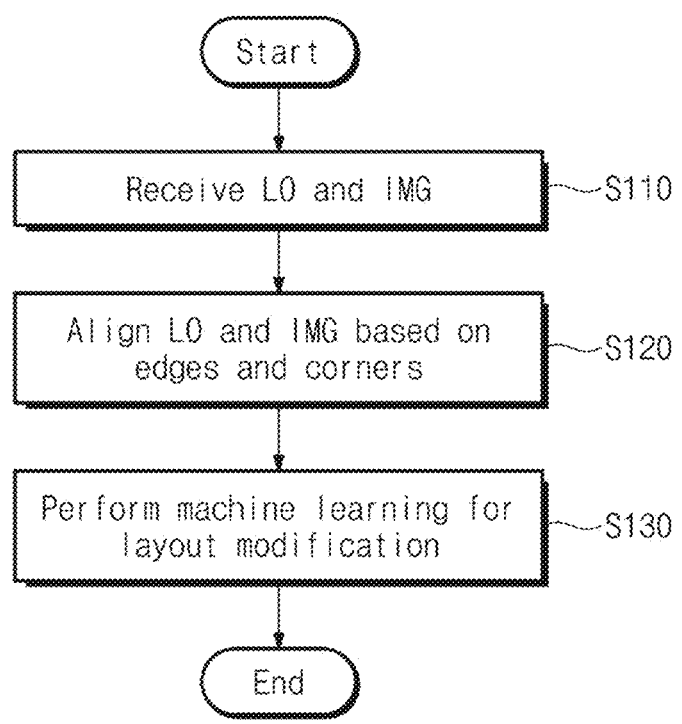
FIG. 3 illustrates an operating method of an electronic device according to at least one embodiment of the present disclosure.

FIG. 3 illustrates an operating method of the electronic device 100 according to at least one embodiment of the present disclosure. Referring to FIGS. 1, 2, and 3, in operation S110, the electronic device 100 receives the layout image LO and the captured image IMG. For example, the learning module 12 of the module(s) 200 executed by the processors 110 of the electronic device 100 may receive the layout image LO and the captured image IMG from the database 16.

In operation S120, the electronic device 100 may align the layout image LO and the captured image IMG based on edges and corners. For example, the learning module 12 of the module(s) 200 executed by the processors 110 of the electronic device 100 may emphasize edges and corners of patterns of the layout image LO and the captured image IMG to generate a new layout image and a new captured image and may align the layout image LO and the captured image IMG by using the new layout image and the new captured image.

In at least one embodiment, outlines of the patterns of the layout image LO or the captured image IMG may be edges. A portion where outlines extending in two or more different orientations from among the outlines of the patterns of the layout image LO or the captured image IMG meet may be a corner.

The learning module 12 according to at least one embodiment of the present disclosure may improve the accuracy of alignment of the layout image LO and the captured image IMG by emphasizing edges and corners and aligning the layout image LO and the captured image IMG.

In operation S130, the electronic device 100 may perform machine learning for layout modification. For example, the learning module 12 of the module(s) 200 executed by the processors 110 of the electronic device 100 may perform machine learning based on the aligned layout image LO and the aligned captured image IMG. The learning module 12 may perform machine learning such that a contour of the aligned captured image IMG is closer to a contour of the aligned layout image LO.

The learning module 12 according to at least one embodiment of the present disclosure performs machine learning based on the layout image LO and the captured image IMG aligned with the improved accuracy. Accordingly, the accuracy of machine learning is improved, and a learning orientation is prevented from being distorted.

Figure 4:
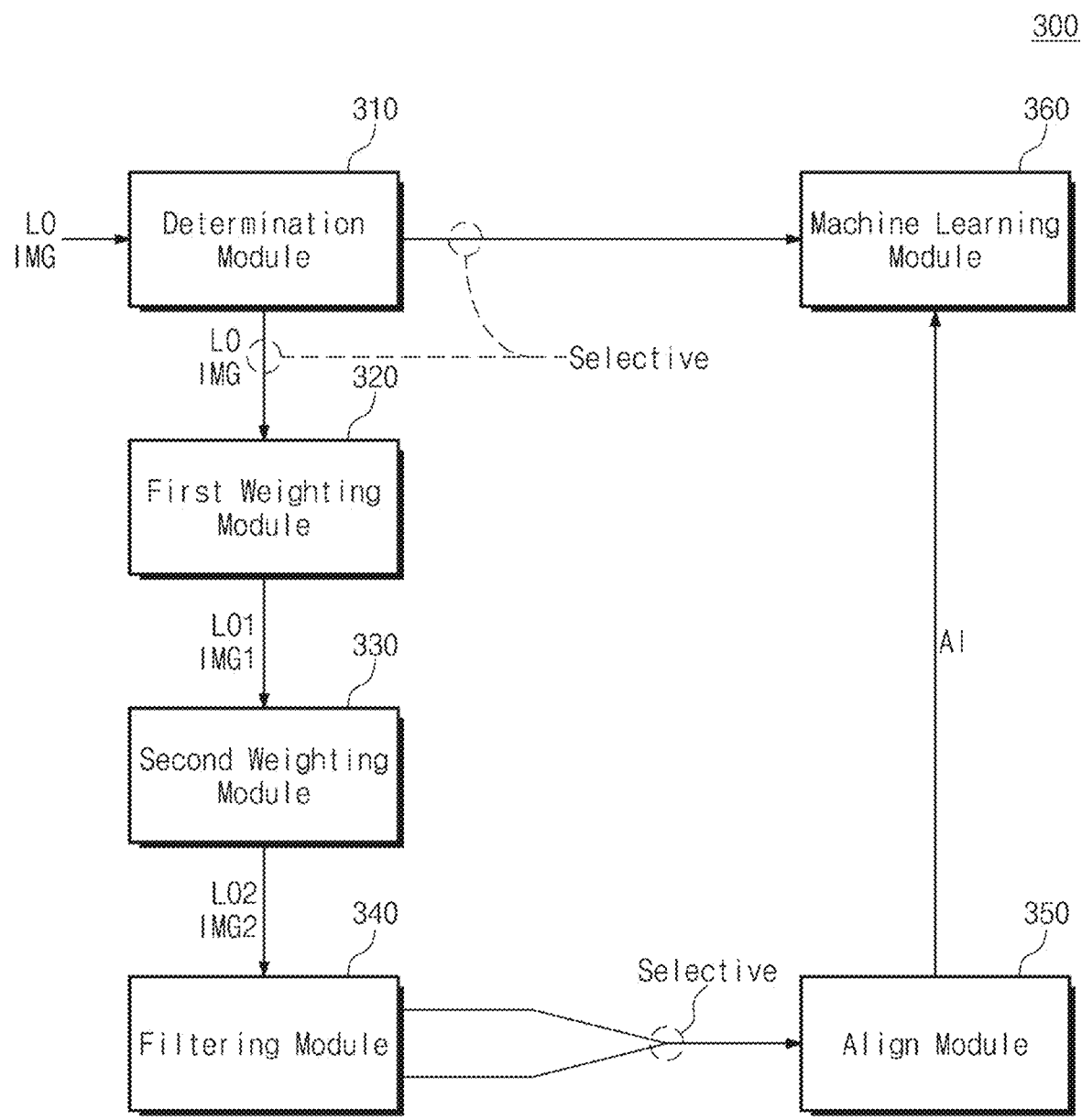
FIG. 4 illustrates a learning module according to at least one embodiment of the present disclosure.

FIG. 4 illustrates a learning module 300 according to at least one embodiment of the present disclosure. In at least one embodiment, the learning module 300 may correspond to the learning module 12 of FIG. 1. Referring to FIGS. 1, 2, and 4, the learning module 300 may include a determination module 310, a first weighting module 320, a second weighting module 330, a filtering module 340, an align module 350, and a machine learning module 360.

The determination module 310 may receive the layout image LO and the captured image IMG (e.g., from the database 16). The determination module 310 may selectively determine whether to emphasize edges and corners with respect to the layout image LO and the captured image IMG. When it is determined that there is no need to emphasize edges and corners, the determination module 310 is configured to send the layout image LO and the captured image IMG to the machine learning module 360. The machine learning module 360 may perform machine learning by using the layout image LO and the captured image IMG where edges and corners are not emphasized. When it is determined that there is a need and/or advantage to emphasize edges and corners, the determination module 310 is configured to send the layout image LO and the captured image IMG to the first weighting module 320.

For example, when it is determined that the edges and corners to be emphasized, the first weighting module 320 receives the layout image LO and the captured image IMG from the determination module 310. The first weighting module 320 may perform a first weighting operation such that edges and/or corners of the layout image LO and the captured image IMG are weighted. For example, the first weighting operation may be used to emphasize the edges of the patterns of the layout image LO and the captured image IMG. The first weighting module 320 may generate a first layout image LO1 and a first captured image IMG1 by emphasizing the edges and/or the corners of the layout image LO and the captured image IMG. The first layout image LO1 may be at least partially different from the layout image LO, and the first captured image IMG1 may be at least partially different from the captured image IMG.

Additionally, when it is determined that the edges and corners and to be emphasized, the second weighting module 330 receives the first layout image LO1 and the first captured image IMG1 from the first weighting module 320. The second weighting module 330 may perform a second weighting operation such that edges and/or corners of the first layout image LO1 and the first captured image IMG1 are weighted. For example, the second weighting operation may be used to emphasize the corners of the patterns of the first layout image LO1 and the first captured image IMG1. The second weighting module 330 may generate a second layout image LO2 and a second captured image IMG2 by emphasizing the edges and/or the corners of the first layout image LO1 and the first captured image IMG1. The second layout image LO2 may be at least partially different from the first layout image LO1, and the second captured image IMG2 may be at least partially different from the first captured image IMG1.

As the edges are weighted (or emphasized) by the first weighting module 320 and the corners are weighted (or emphasized) by the second weighting module 330, the influence of edges and corners in the patterns of the second layout image LO2 and the second captured image IMG2 may increase compared to the influence of edges and corners in the patterns of the layout image LO and the captured image IMG.

The filtering module 340 is configured to receive the second layout image LO2 and the second captured image IMG2 from the second weighting module 330. The filtering module 340 may further increase the influence of edges and corners by selectively performing filtering with respect to the second layout image LO2 and the second captured image IMG2.

In at least one embodiment, when a filtering target is absent from the second layout image LO2 and the second captured image IMG2, the filtering module 340 is configured to output the second layout image LO2 and the second captured image IMG2. When a filtering target is present in the second layout image LO2 and the second captured image IMG2, the filtering module 340 is configured to generate a third layout image LO3 (refer to FIG. 13) and a third captured image IMG3 (refer to FIG. 13) by performing filtering with respect to the second layout image LO2 and the second captured image IMG2 and may output the third layout image LO3 and the third captured image IMG3.

The align module 350 may receive the second layout image LO2 and the second captured image IMG2 from the filtering module 340 and/or may receive the third layout image LO3 and the third captured image IMG3 from the filtering module 340. The align module 350 may align the received layout image (e.g., the second layout image LO2 or the third layout image LO3) and the received captured image (e.g., the second captured image IMG2 or the third captured image IMG3), based on the received layout image (e.g., the second layout image LO2 or the third layout image LO3) and the received captured image (e.g., the second captured image IMG2 or the third captured image IMG3).

The align module 350 may determine alignment information AI as a result of aligning the received layout image (e.g., the second layout image LO2 or the third layout image LO3) and the received captured image (e.g., the second captured image IMG2 or the third captured image IMG3). The alignment information AI may include information indicating how much the layout image LO is shifted with respect to the captured image IMG or information indicating how much the captured image IMG is shifted with respect to the layout image LO, for example, relative location information.

The align module 350 may send the alignment information AI to the machine learning module 360.

The machine learning module 360 may receive the layout image LO and the captured image IMG from the determination module 310. The machine learning module 360 may selectively receive the alignment information AI from the align module 350. For example, when it is determined that there is no need to emphasize edges and corners, the machine learning module 360 may not receive the alignment information AI from the align module 350. Without the alignment information AI, the machine learning module 360 may perform machine learning with respect to the modification module 13 for generating the modified layout image MLO based on the layout image LO and the captured image IMG, such that the modified layout image MLO is configured to produce semiconductor devices similar to the layout image LO, from the layout image LO.

When it is determined that there is a need to emphasize edges and corners, the machine learning module 360 may align the layout image LO and the captured image IMG based on the alignment information AI. For example, the machine learning module 360 may align the layout image LO and the captured image IMG by shifting the layout image LO or the captured image IMG based on the alignment information AI (e.g., based on the relative location information included in the alignment information AI). Based on the aligned layout image LO and the aligned captured image IMG, the machine learning module 360 may perform machine learning with respect to the modification module 13 for generating the modified layout image MLO.

As described above, the learning module 12 may generate images, in which edges and corners are emphasized, from the layout image LO and the captured image IMG and may detect the alignment information AI from the images where edges and corners are emphasized. The learning module 12 may align the layout image LO and the captured image IMG based on the alignment information AI detected based on the emphasized edges and corners and may perform machine learning. As machine learning is performed with the improved accuracy through the emphasized edges and corners, the learning module 12 may train the modification module 13 more accurately.

Figure 5:
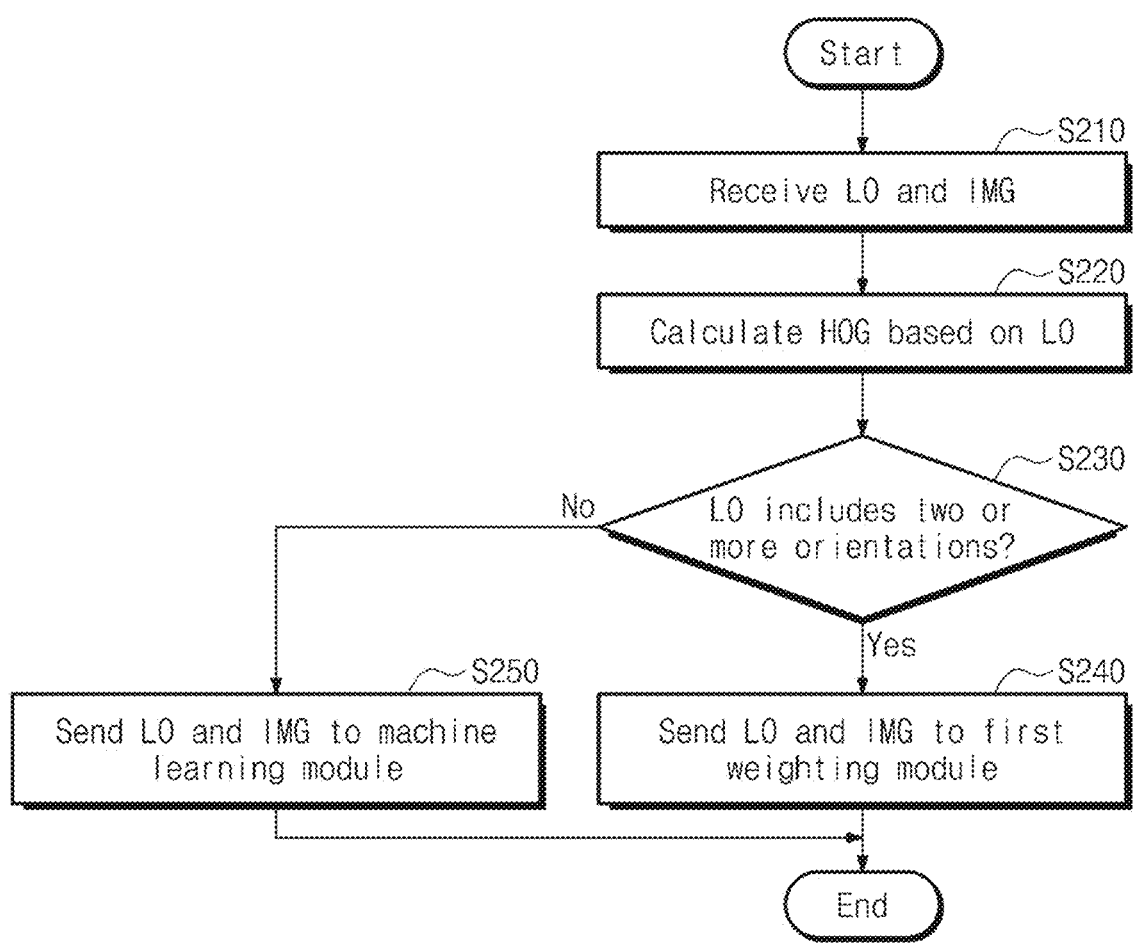
FIG. 5 illustrates an example in which a determination module determines whether to emphasize edges and corners.

FIG. 5 illustrates an example in which the determination module 310 determines whether to emphasize edges and corners. Referring to FIGS. 4 and 5, in operation S210, the determination module 310 receives the layout image LO and the captured image IMG.

In operation S220, the determination module 310 calculates a histogram of oriented gradient (HOG) based on the layout image LO. For example, the determination module 310 may detect an orientation of outlines of patterns in the layout image LO. The determination module 310 may calculate the HOG based on the layout image LO, based on the captured image IMG, or based on the layout image LO and the captured image IMG.

In operation S230, the determination module 310 determines whether the layout image LO includes two or more orientations. When it is determined that the layout image LO includes two or more orientations, in operation S240, the determination module 310 may send the layout image LO and the captured image IMG to the first weighting module 320. That is, the determination module 310 may determine that there is a need to emphasize edges and corners based on a determination that there are two or more orientations.

When the layout image LO or the captured image IMG does not include two or more orientations (e.g., when the layout image LO or the captured image IMG includes one orientation or does not include an orientation) in operation S250, the determination module 310 may send the layout image LO and the captured image IMG to the machine learning module 360. That is, the determination module 310 may determine that there is no need to emphasize edges and corners.

Figure 6:
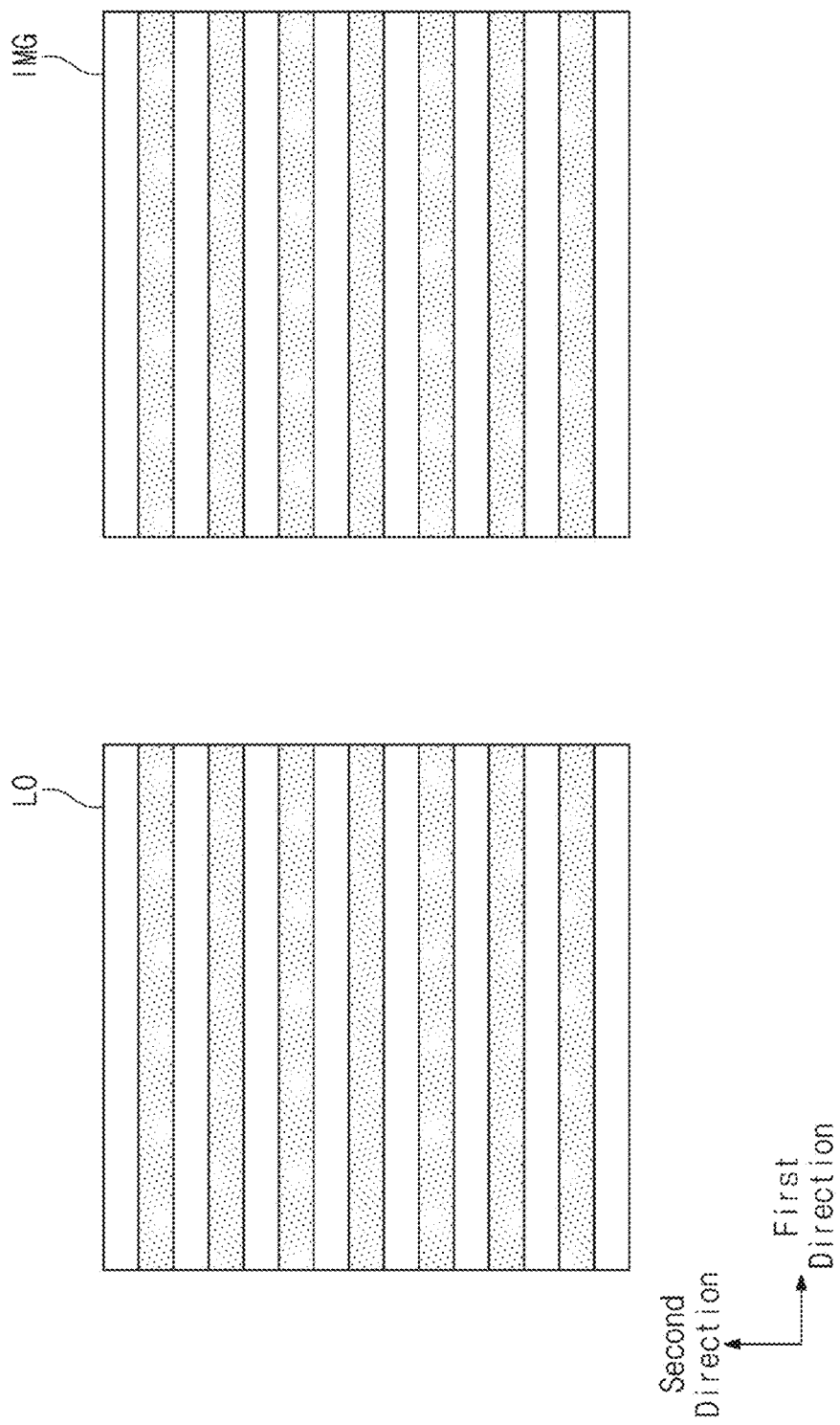
FIG. 6 illustrates an example of a layout image and a captured image including patterns having one direction.

FIG. 6 illustrates an example of the layout image LO and the captured image IMG including patterns having one orientation. Referring to FIG. 6, patterns of the layout image LO and the captured image IMG, for example, dotted patterns extend in the first direction. Outlines of the patterns also extend in the first direction. The outlines of the patterns extend only in the first direction and do not extend in the second direction.

For example, when the patterns of the layout image LO and the captured image IMG have only one orientation, a corner may be absent from the layout image LO and the captured image IMG. When a corner may be absent from the layout image LO and the captured image IMG, based on the layout image LO and the captured image IMG, the determination module 310 may determine that there is no need to emphasize edges and corners.

Figure 7:
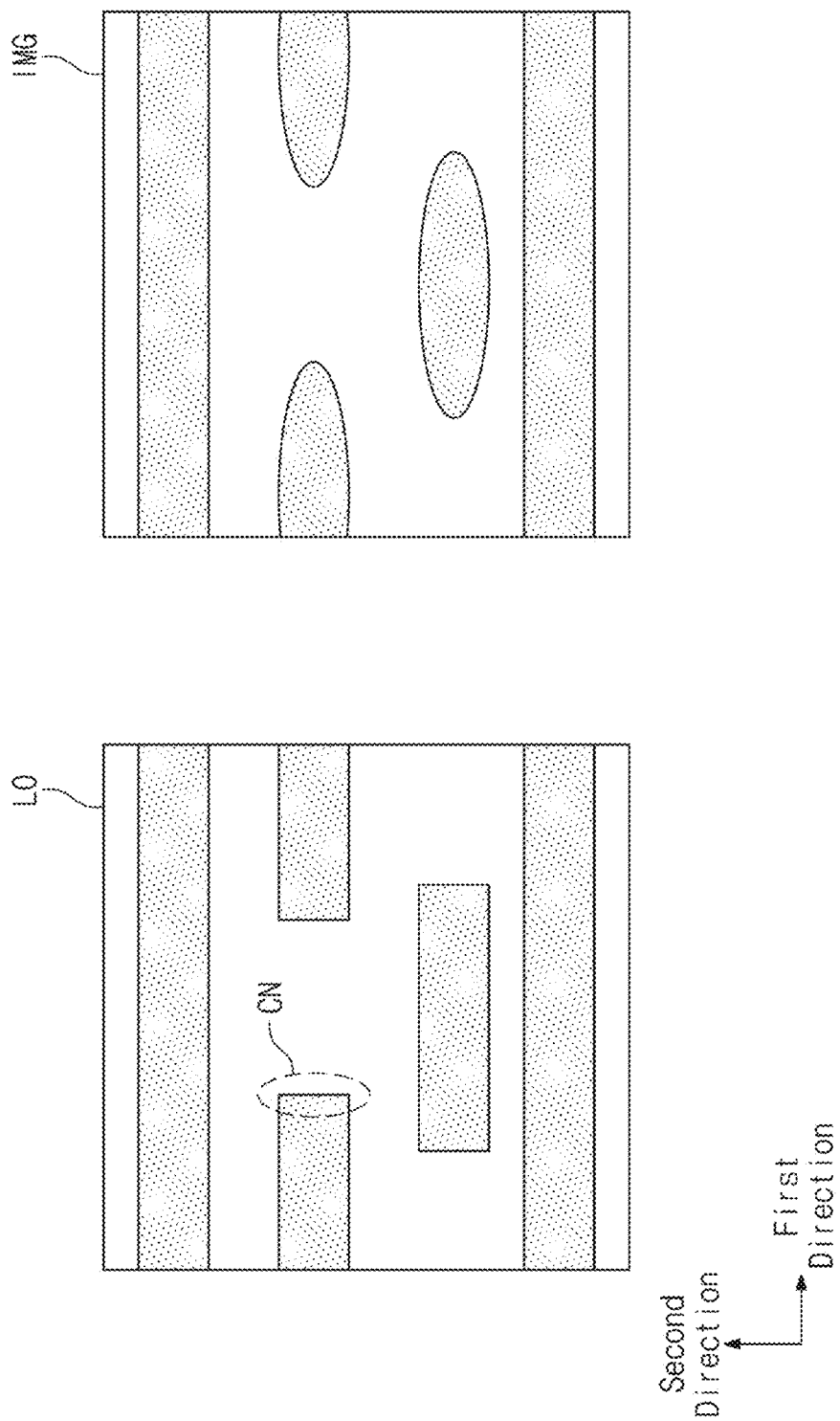
FIG. 7 illustrates an example of a layout image and a captured image including patterns having two orientations.

FIG. 7 illustrates an example of the layout image LO and the captured image IMG including patterns having two orientations. Referring to FIGS. 5 and 7, outlines of patterns extending in the first direction and outlines of patterns extending in the second direction may contact each other at corners CN. In at least one embodiment, a main direction in which the patterns of the layout image LO and the captured image IMG extend may be the first direction. In the layout image LO and the captured image IMG, outlines that extend in a direction different from the main direction of the patterns may be the corners CN. In the layout image LO and the captured image IMG of FIG. 7, outlines of patterns extending in the second direction may be the corners CN.

When the patterns of the layout image LO and the captured image IMG include two or more orientations, the patterns of the layout image LO and the captured image IMG may be determined to include corners and edges. When the layout image LO and the captured image IMG have corners and edges, based on the layout image LO and the captured image IMG, the determination module 310 may determine that there is a need to emphasize edges and corners.

Figure 8:
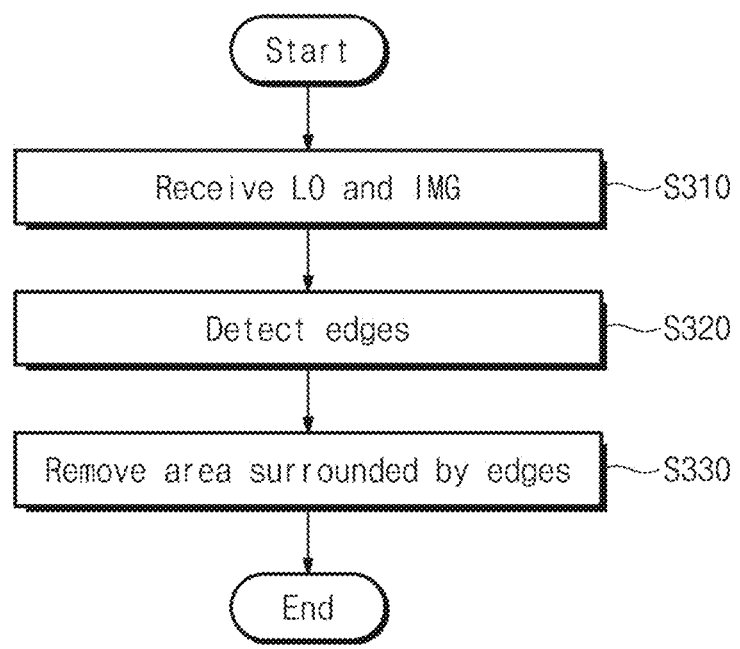
FIG. 8 illustrates an example of a method in which a first weighting module performs a first weighting operation.

FIG. 8 illustrates an example of a method in which the first weighting module 320 performs a first weighting operation. Referring to FIGS. 4 and 8, in operation S310, the first weighting module 320 receives the layout image LO and the captured image IMG.

In operation S320, the first weighting module 320 may detect edges. For example, the first weighting module 320 may detect edges of patterns of the layout image LO and the captured image IMG. For example, the first weighting module 320 may detect outlines of the patterns of the layout image LO and the captured image IMG as edges.

In operation S330, the first weighting module 320 removes an area surrounded by the edges. For example, the first weighting module 320 may remove the remaining pixel values other than pixel values of the outlines in the patterns of the layout image LO and the captured image IMG. The first weighting module 320 may emphasize the edges by making only the edges leaved alone in the patterns of the layout image LO and the captured image IMG.

Figure 9:
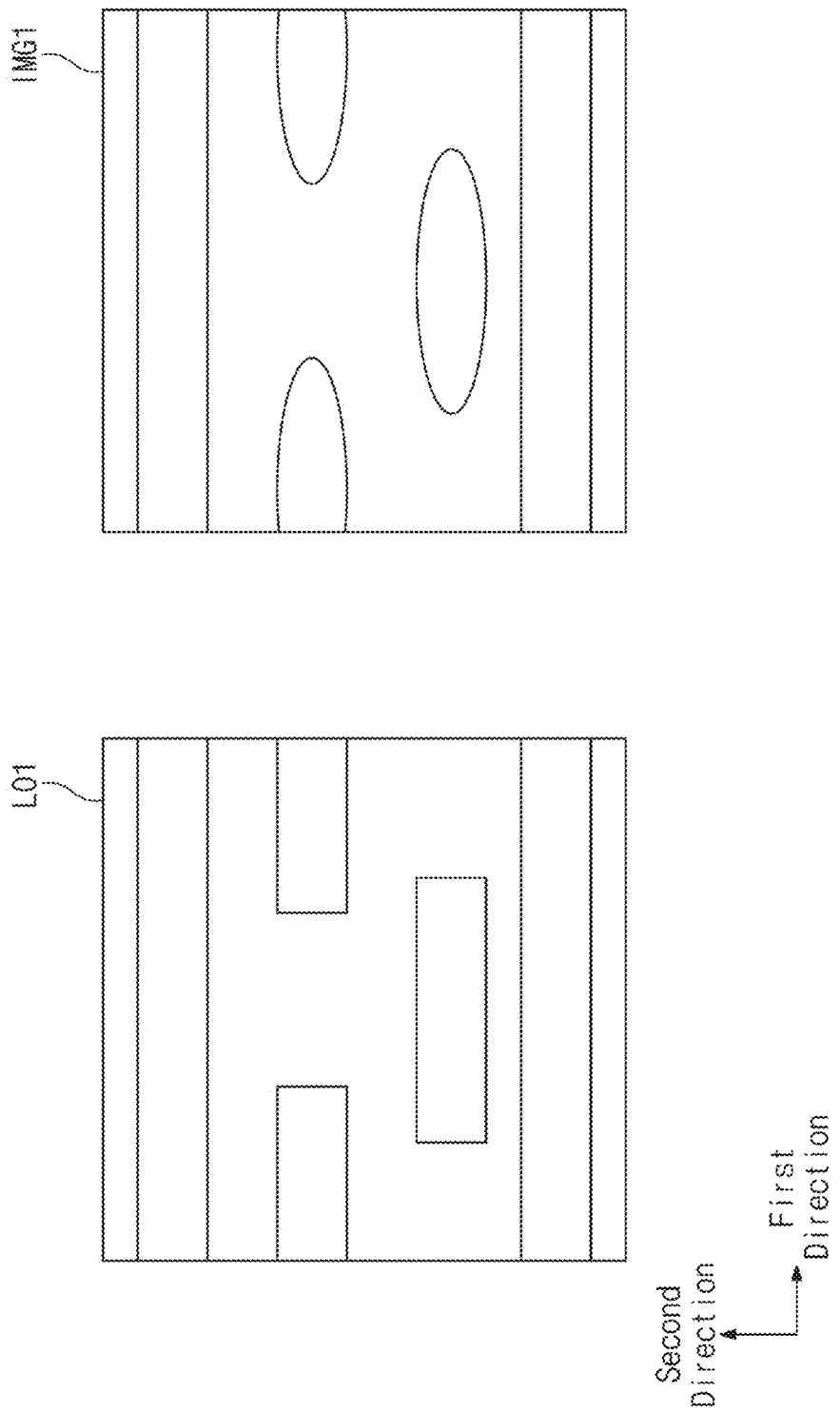
FIG. 9 illustrates an example of a first layout and a first captured image generated as a first weighting module performs a first weighting operation.

FIG. 9 illustrates an example of the first layout image LO1 and the first captured image IMG1 generated as the first weighting module 320 performs a first weighting operation. Compared to the layout image LO and the captured image IMG of FIG. 7, the first weighting module 320 may emphasize edges by removing pixel values of dotted areas in the patterns and leaving only the edges.

Figure 10:
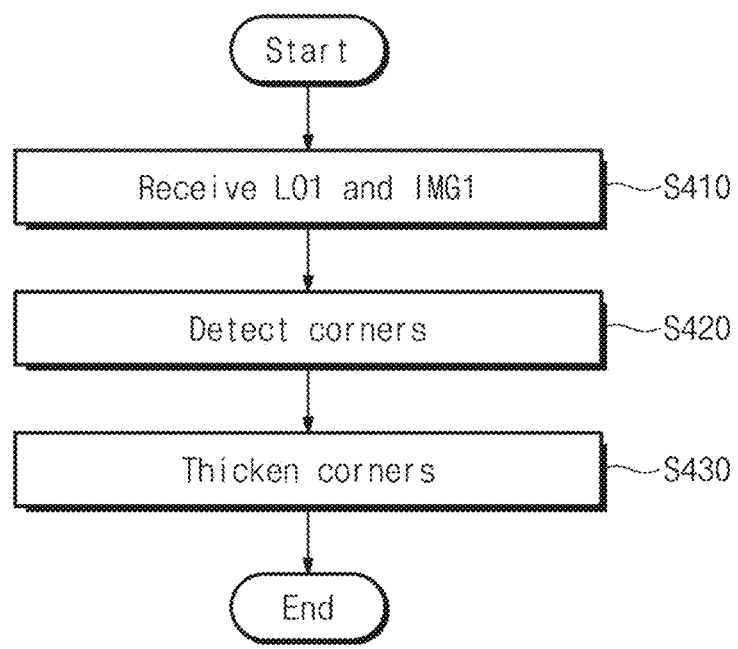
FIG. 10 illustrates an example of a method in which a second weighting module performs a second weighting operation.

FIG. 10 illustrates an example of a method in which the second weighting module 330 performs a second weighting operation. Referring to FIGS. 4 and 10, in operation S410, the second weighting module 330 receives the first layout image LO1 and the first captured image IMG1.

In operation S420, the second weighting module 330 may detect corners. For example, the second weighting module 330 may detect corners from edges of patterns of the first layout image LO1 and the first captured image IMG1.

In operation S430, the second weighting module 330 thickens the corners. For example, the second weighting module 330 may emphasize the corners by expanding thicknesses of the corners.

Figure 11:
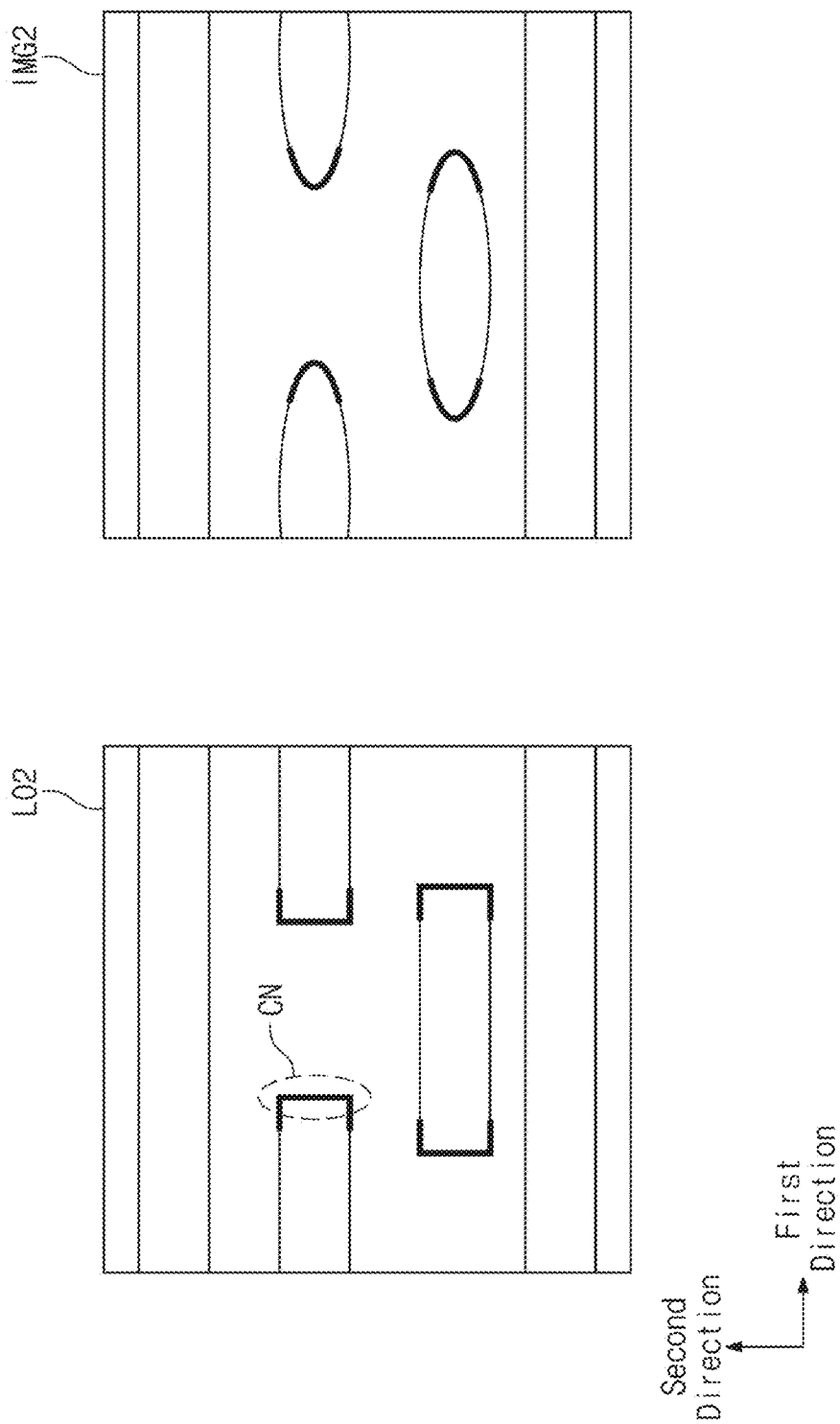
FIG. 11 illustrates an example of a second layout image and a second captured image generated as a second weighting module performs a second weighting operation.

FIG. 11 illustrates an example of the second layout image LO2 and the second captured image IMG2 generated as the second weighting module 330 performs a second weighting operation. Compared to the first layout image LO1 and the first captured image IMG1 of FIG. 9, the second weighting module 330 may generate the second layout image LO2 and the second captured image IMG2 in which the corners CN are emphasized, by expanding thicknesses of the corners CN extending in a direction (e.g., the second direction) different from the main direction (e.g., the first direction) of the edges.

Figure 12:
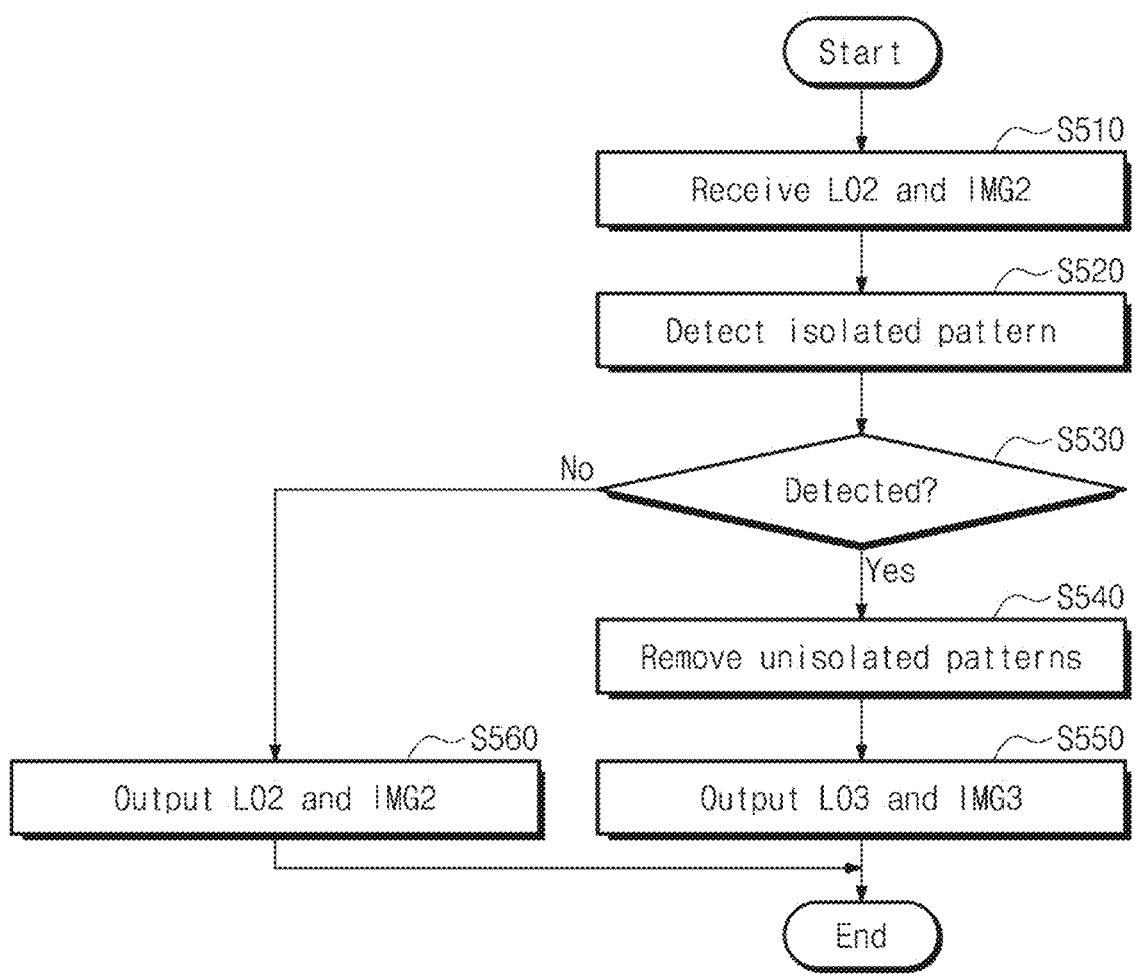
FIG. 12 illustrates an example of a method in which a filtering module selectively performs filtering.

FIG. 12 illustrates an example of a method in which the filtering module 340 selectively performs filtering. Referring to FIGS. 4 and 12, in operation S510, the filtering module 340 receives the second layout image LO2 and the second captured image IMG2.

In operation S520, the filtering module 340 may detect an isolated pattern from the second layout image LO2 and the second captured image IMG2. For example, the filtering module 340 may detect patterns, in which all the edges are included in the second layout image LO2 and the second captured image IMG2 and which are not connected to the other patterns, from among the patterns of the second layout image LO2 and the second captured image IMG2, as isolated patterns.

In operation S530, the filtering module 340 determines whether an isolated pattern is detected. When an isolated pattern is detected, in operation S540, the filtering module 340 removes un-isolated patterns. In operation S550, the filtering module 340 outputs the third layout image LO3 and the third captured image IMG3, in which the un-isolated patterns are removed, to the align module 350.

When an isolated pattern is not detected, in operation S560, the filtering module 340 may output the second layout image LO2 and the second captured image IMG2 to the align module 350.

That is, when the second layout image LO2 and the second captured image IMG2 include an isolated pattern, the filtering module 340 may perform filtering. As filtering is performed such that only an isolated pattern is left alone, the filtering module 340 may generate the third layout image LO3 and the third captured image IMG3. That is, when the second layout image LO2 and the second captured image IMG2 do not include an isolated pattern, the filtering module 340 may omit filtering.

Figure 13:
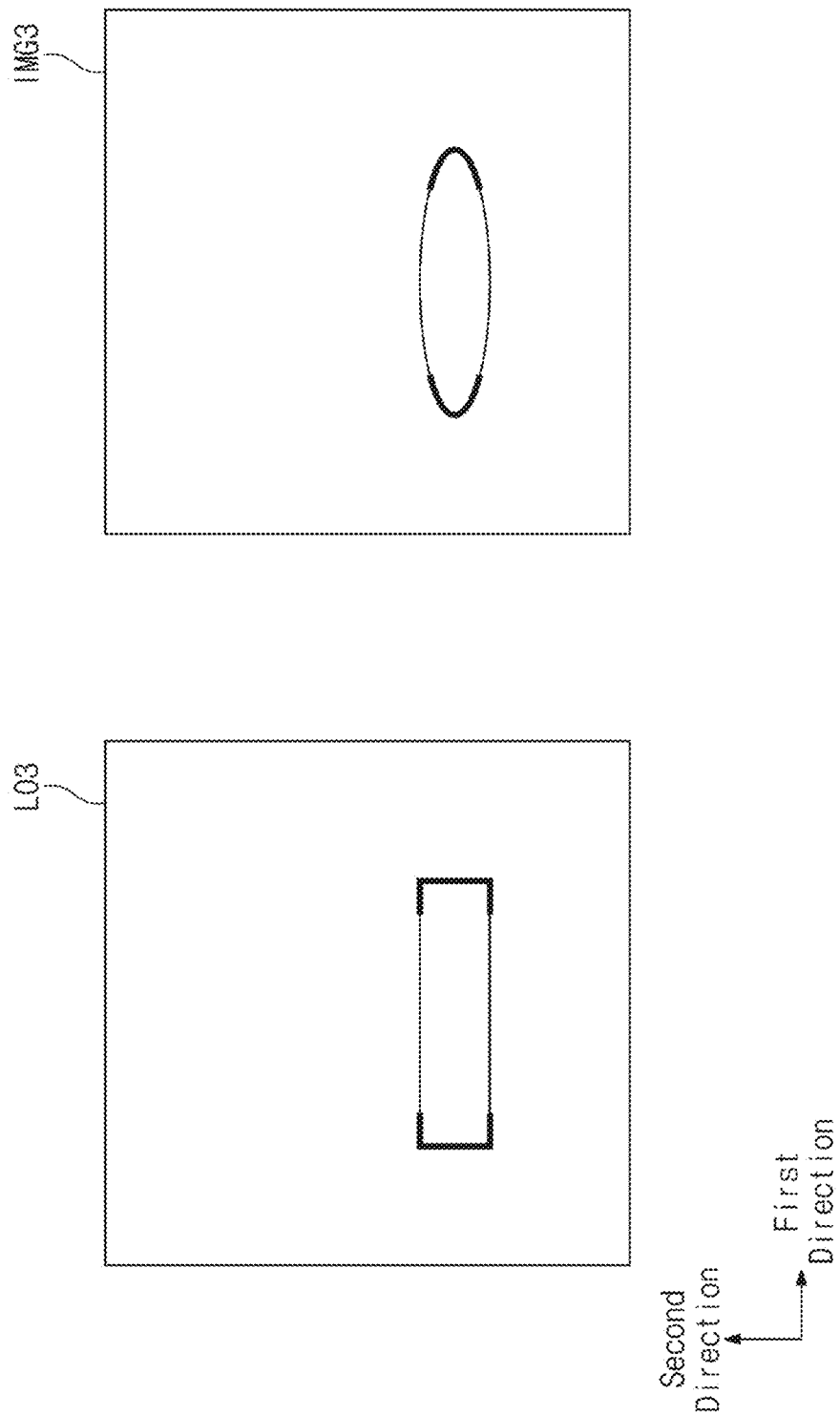
FIG. 13 illustrates an example of a third layout image and a third captured image generated as a filtering module performs filtering.

FIG. 13 illustrates an example of the third layout image LO3 and the third captured image IMG3 generated as the filtering module 340 performs filtering. Compared to the second layout image LO2 and the second captured image IMG2 of FIG. 11, the filtering module 340 may generate the third layout image LO3 and the third captured image IMG3, in which the edges and the corners are emphasized, by making only the isolated pattern leaved alone.

Figure 14:
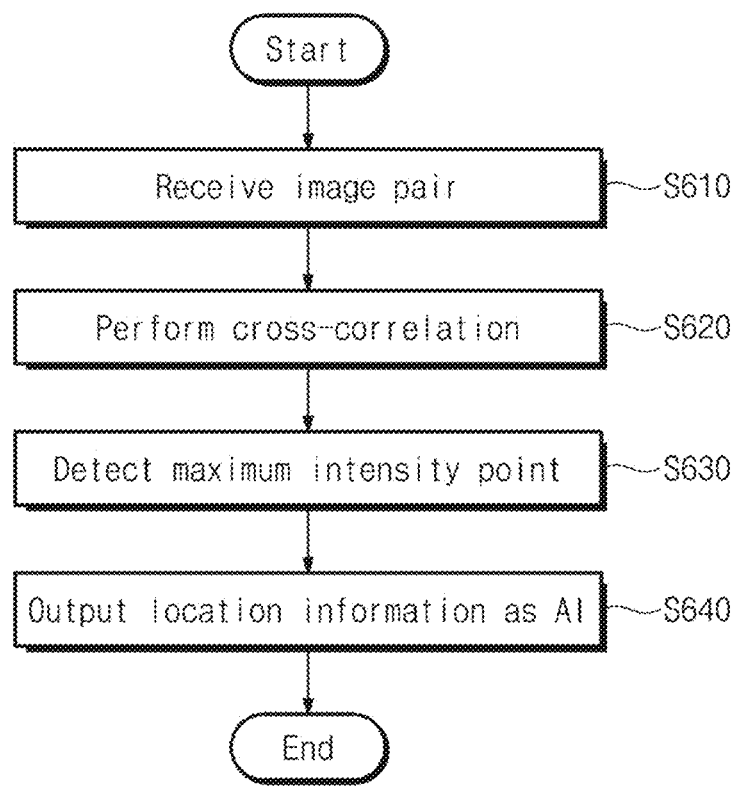
FIG. 14 illustrates an example of a method in which an align module performs an alignment operation.

FIG. 14 illustrates an example of a method in which the align module 350 performs an alignment operation. Referring to FIGS. 4 and 14, in operation S610, the align module 350 receives an image pair. For example, the align module 350 may receive an image pair including the second layout image LO2 and the second captured image IMG2 from the filtering module 340 or may receive an image pair including the third layout image LO3 and the third captured image IMG3 from the filtering module 340.

In operation S620, the align module 350 performs cross-correlation. For example, the align module 350 may perform cross-correlation with respect to the images of the image pair. The align module 350 may perform fast Fourier cross-correlation with respect to the images of the image pair.

In operation S630, the align module 350 detects a maximum intensity point. For example, the align module 350 may detect a point of a cross-correlation result, which has a maximum value, as the maximum intensity point.

In operation S640, the align module 350 outputs location information of the maximum intensity point as the alignment information AI. The maximum intensity point may indicate a location at which the similarity of the images of the image pair is the highest. Accordingly, the maximum intensity point may correspond to shift information of the images of the image pair.

The align module 350 calculates the alignment information AI based on the images of the image pair, in which edges and corners are emphasized. Accordingly, the align module 350 may provide the more accurate alignment information AI to the machine learning module 360.

In at least one embodiment, when the emphasis of edges and corners is not performed, the machine learning module 360 may calculate a mean square error (MSE) between the layout image LO and the captured image IMG and may align the layout image LO and the captured image IMG at a point where the MSE is the smallest.

When the emphasis of edges and corners is performed, the machine learning module 360 may align the layout image LO and the captured image IMG by using the alignment information AI. That is, when the alignment information AI is provided, an additional calculation (e.g., a calculation of the MSE) for aligning the layout image LO and the captured image IMG may be omitted.

Figure 15:
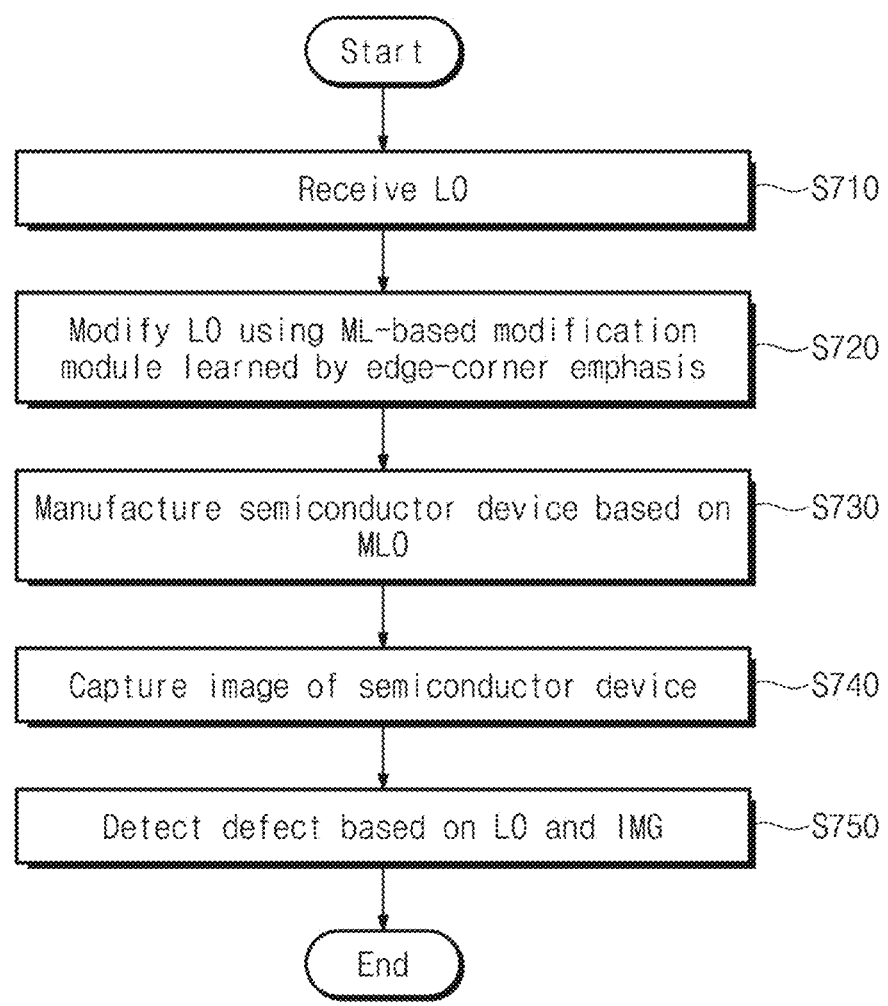
FIG. 15 illustrates an example of a method in which a semiconductor manufacturing system manufactures semiconductor devices.

FIG. 15 illustrates an example of a method in which the semiconductor manufacturing system 10 manufactures semiconductor devices. Referring to FIGS. 1 and 15, in operation S710, the semiconductor manufacturing system 10 receives the layout image LO. For example, the layout generation module 11 may generate the layout image LO. The modification module 13 may receive the layout image LO from the layout generation module 11.

In operation S720, the semiconductor manufacturing system 10 modifies the layout image LO by using the machine learning (ML)-based modification module 13 trained by the edge-corner emphasis. For example, the modification module 13 may generate the modified layout image MLO from the layout image LO by using a modification module trained by the edge-corner emphasis. The modified layout image MLO may reflect, for example, the PPC, the OPC, and/or the PPC and the OPC.

In operation S730, the semiconductor manufacturing system 10 manufactures semiconductor devices by using the modified layout image MLO. For example, the manufacture device 14 may receive the modified layout image MLO from the modification module 13. The manufacture device 14 may manufacture the semiconductor devices by applying the processes PRC to the wafer WAF.

In operation S740, the semiconductor manufacturing system 10 may capture an image of a semiconductor device. For example, the imaging device 15 may generate the captured image IMG by capturing an image of the wafer WAF to which the processes PRC are applied.

In operation S750, the semiconductor manufacturing system 10 may detect defects based on the layout image LO and the captured image IMG. For example, the defect detection module 17 may compare the layout image LO and the captured image IMG and may determine whether the captured image IMG coincides with the design of the layout image LO. When the captured image IMG coincides with the design of the layout image LO, the semiconductor devices may be shipped. When the captured image IMG does not coincide with the design of the layout image LO, the semiconductor devices may be determined as defective products and may not be shipped. In at least one embodiment, the captured image IMG and/or the defects may be used in, e.g., unsupervised training of the ML-based modification module and/or the learning module, such that training of the ML-based modification module and/or the learning module may be updated.

For example, in at least one embodiment, when a defect is detected as a result of comparing the layout image LO and the captured image IMG, the method of emphasizing edges and corners, which is described with reference to FIGS. 1 to 14, may be used. For example, the defect detection module 17 may calculate the alignment information AI by generating an image pair by emphasizing (e.g., applying the first weighting operation, the second weighting operation, and the filtering operation to) edges and corners of the layout image LO and the captured image IMG and performing cross-correlation with respect to the generated image pair. The defect detection module 17 may align the layout image LO and the captured image IMG based on the alignment information AI and may detect defects.

In the above embodiments, components according to the present disclosure are described by using the terms "first", "second", "third", etc. However, the terms "first", "second", "third", etc. may be used to distinguish components from each other and do not limit the present disclosure. For example, the terms "first", "second", "third", etc. do not involve an order or a numerical meaning of any form.

In the above embodiments, components according to embodiments of the present disclosure are referenced by using functional blocks. The functional blocks, including those including "unit", " . . . er/or," "module", etc., unless expressly indicated otherwise, may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a System-on-Chip (SoC), a programmable logic unit, a microprocessor, application-specific integrated circuit (ASIC), an integrated circuit, an application specific IC (ASIC), a field programmable gate array (FPGA), and a complex programmable logic device (CPLD), firmware driven in hardware devices, etc. Also, the blocks may include circuits implemented with semiconductor elements in an integrated circuit, or circuits enrolled as an intellectual property (IP).

According to embodiments of the present disclosure, source information is automatically aligned based on edges and corners. An electronic device that aligns source information with improved accuracy and speed such that the accuracy and speed of machine learning for the manufacture of a semiconductor device are improved and a time and costs for the manufacture of a semiconductor device are reduced and an operating method of the electronic device are provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An operating method of an electronic device which includes a processor and is configured to support manufacture of a semiconductor device, the method comprising:
receiving, at the processor, a layout image for the manufacture of the semiconductor device and a captured image generated by capturing the semiconductor device actually manufactured;
emphasizing, at the processor, edges and corners of the layout image and of the captured image in response to a determination that there are two or more different orientations in the layout image;
aligning, at the processor, the layout image and the captured image based on a result of the emphasizing of the edges and the corners of the layout image and of the captured image; and
performing, at the processor, learning based on the aligned layout image and the aligned captured image such that a first modified layout image is generated from the layout image,
wherein the semiconductor device is manufactured based on a second modified layout image generated from the layout image based on the learning.

2. The method of claim 1, further comprising:
determining a histogram of oriented gradient (HOG) from the layout image,
wherein the determination that there are two or more different orientations is based on the HOG.

3. The method of claim 2, further comprising:
aligning the layout image and the captured image without emphasizing the edges and the corners based on a determination that there is only one orientation based on the HOG.

4. The method of claim 1, wherein the emphasizing the edges includes removing an area surrounded by the edges and the corners from the layout image and the captured image.

5. The method of claim 1, wherein the emphasizing the corners includes expanding the corners.

6. The method of claim 1, wherein the aligning includes detecting at least one isolated pattern from at least one of the layout image or the captured image; and
removing remaining patterns, other than the detected at least one isolated pattern, from the layout image and the captured image.

7. The method of claim 6, wherein the aligning further includes maintaining the layout image and the captured image in response to the at least one isolated pattern not being detected.

8. The method of claim 1, wherein the aligning includes generating a second layout image and a second captured image based on the edges and the corners of the layout image and the captured image; and
aligning the layout image and the captured image based on the second layout image and the second captured image.

9. The method of claim 8, wherein the aligning of the layout image and the captured image based on the edges and the corners of the second layout image and the second captured image includes
determining cross-correlation of the second layout image and the second captured image; and
aligning the layout image and the captured image based on a result of the cross-correlation.

10. The method of claim 1, wherein the generating the first modified layout image and the second modified layout image includes applying at least one of a process proximity correction (PPC) or an optical proximity correction (OPC) to the layout image.

11. The method of claim 1, wherein the processor is trained to generate a third modified layout image from a second layout image, and
wherein the third modified layout image is used to manufacture a second semiconductor device.

12. An operating method of an electronic device which includes a processor and is configured to support manufacture of a semiconductor device, the method comprising:
receiving, at the processor, a layout image for the manufacture of the semiconductor device; and
generating, at the processor, a modified layout image by modifying the layout image using a machine learning-based modification module,
wherein the machine learning-based modification module is trained to generate the modified layout image from the layout image based on a plurality of layout images and a plurality of captured images of a plurality of semiconductor devices actually manufactured based on a plurality of modified layout images generated from the plurality of layout images, and
wherein the machine learning-based modification module is trained to emphasize and align edges and corners of the plurality of layout images and the plurality of captured images and to generate the modified layout image from the layout image based on the aligned layout images and the aligned captured images.

13. The method of claim 12, wherein the machine learning-based modification module is configured to
generate a plurality of second layout images and a plurality of second captured images from the plurality of layout images and the plurality of captured images based on the edges and the corners, respectively; and
align the plurality of layout images and the plurality of captured images based on the plurality of second layout images and the plurality of second captured images, respectively.

14. The method of claim 13, wherein the generate the plurality of second layout images and the plurality of second captured images includes removing an area surrounded by the edges and the corners from the plurality of layout images and the plurality of captured images.

15. The method of claim 13, wherein the generate the plurality of second layout images and the plurality of second captured images includes expanding the corners of the second captured images.

16. The method of claim 13, wherein the generate the plurality of second layout images and the plurality of captured images includes detecting at least one isolated pattern from at least one of the layout image or the captured image and removing remaining patterns, other than the at least one isolated pattern, of the plurality of layout images and the plurality of captured images.

17. The method of claim 13, wherein the align the plurality of layout images and the plurality of captured images, respectively, is based on a result of performing cross-correlation with respect to the plurality of second layout images and the plurality of second captured images.

18. The method of claim 12, wherein the generating of the modified layout image by modifying the layout image by using the machine learning-based modification module includes generating the modified layout image by applying at least one of a process proximity correction (PPC) or an optical proximity correction (OPC) to the layout image.

19. The method of claim 12, further comprising:
using the modified layout image to manufacture the semiconductor device.

20. An electronic device for manufacture of a semiconductor device, comprising:
a processor; and
a memory including a plurality of layout images for manufacture of a plurality of semiconductor devices and a plurality of captured images captured after the plurality of semiconductor devices are manufactured,
wherein the processor is configured to perform learning by emphasizing edges and corners of the plurality of layout images and the plurality of captured images to align the plurality of layout images and the plurality of captured image such that the processor is trained to generate a modified layout image from a layout image based on the aligned layout images and the aligned captured images.

* * * * *